(12) United States Patent
Mitani

(10) Patent No.: US 11,647,132 B2
(45) Date of Patent: May 9, 2023

(54) COMMUNICATION TERMINAL, METHOD FOR CONTROLLING COMMUNICATION TERMINAL, COMMUNICATION SYSTEM, AND STORAGE MEDIUM

(71) Applicant: CANON KABUSHIKI KAISHA, Tokyo (JP)

(72) Inventor: Shigeyuki Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 16/923,997

(22) Filed: Jul. 8, 2020

(65) Prior Publication Data
US 2021/0014404 A1 Jan. 14, 2021

(30) Foreign Application Priority Data
Jul. 12, 2019 (JP) .............................. JP2019-130283

(51) Int. Cl.
*H04N 1/00* (2006.01)
*H04N 1/32* (2006.01)
(Continued)

(52) U.S. Cl.
CPC ......... *H04N 1/00442* (2013.01); *G06F 16/41* (2019.01); *G06F 16/433* (2019.01);
(Continued)

(58) Field of Classification Search
CPC ........... H04N 1/00119; H04N 1/00244; H04N 1/00442; H04N 1/32101; H04N 5/232933; H04N 5/232939; H04N 2101/00; H04N 2201/0084; H04N 2201/3264; H04N 2201/3273; H04N 2201/3278
See application file for complete search history.

(56) References Cited

U.S. PATENT DOCUMENTS 6,393,431 B1 * 5/2002 Salvati ............... A61B 1/00052

FOREIGN PATENT DOCUMENTS

JP 2003219327 A 7/2003
JP 2005293339 A 10/2005
(Continued)

*Primary Examiner* — Daniel M Pasiewicz
(74) *Attorney, Agent, or Firm* — Canon U.S.A., Inc. IP Division

(57) ABSTRACT

A communication terminal acquires a captured image from an image capturing apparatus and transfers the captured image to a server. The communication terminal includes: a first communication unit configured to communicate with the image capturing apparatus; a second communication unit configured to communicate with the server; a display unit configured to communicate with the image capturing apparatus, acquire, from the image capturing apparatus, a captured image managed by the image capturing apparatus, and display the captured image; a sound input unit configured to accept sound input for generating a terminal sound memo related to the displayed captured image; a storage unit configured to store the generated terminal sound memo in association with the captured image; and a control unit configured to perform control so that the second communication unit transfers, to the server, the acquired captured image and the generated terminal sound memo associated with the captured image.

16 Claims, 14 Drawing Sheets

(51) Int. Cl.
*H04N 101/00* (2006.01)
*G06F 16/432* (2019.01)
*G06F 16/41* (2019.01)

(52) U.S. Cl.
CPC ....... *G06F 16/434* (2019.01); *H04N 1/00119* (2013.01); *H04N 1/00244* (2013.01); *H04N 1/32101* (2013.01); H04N 2101/00 (2013.01); H04N 2201/0084 (2013.01); H04N 2201/3264 (2013.01); H04N 2201/3273 (2013.01); H04N 2201/3278 (2013.01)

(56) References Cited

FOREIGN PATENT DOCUMENTS

| | | |
|---|---|---|
| JP | 2015088788 A | 5/2015 |
| JP | 2018-186467 A | 11/2018 |

* cited by examiner

COMMUNICATION TERMINAL, METHOD FOR CONTROLLING COMMUNICATION TERMINAL, COMMUNICATION SYSTEM, AND STORAGE MEDIUM

BACKGROUND

Field

The present disclosure relates to a technique for transferring an image, which is captured by an image capturing apparatus, such as a digital camera, to a server on the Internet, via a communication terminal, such as a smartphone, which is connected to the image capturing apparatus.

Description of the Related Art

With the development of digital image capturing techniques and communication techniques, mass media such as news media and news agencies require a system that enables rapid transmission, by using a communication technique, of a large number of images captured in the field to a base where those images are edited, the system also performing editing and processing to output the resulting images on a medium. Therefore, the mass media need an image capturing apparatus having an advanced communication function and need a communication technique that is usable at a high speed in a wide area.

Although recent digital cameras have wireless communication functions, such functions are based on near field communication. Therefore, for transmitting data obtained in the field, such as images, from remote locations to a base where such data can be edited, equipment, such as personal computers or access points, which are used to connect to the Internet, and a communication environment are needed. Thus, a geographical area where such data can be collected in the field and transmitted to a base by using conventional digital cameras is limited.

Rapid transmission of gathered data by utilizing public wireless communication systems, from any region of a country to a base where the data is edited, via a mobile communication terminal such as a smartphone, has been examined. In the future, Fifth Generation (5G) communication is anticipated to become widespread, and communication environments in which large-capacity data is transmitted at high speed with short delays are expected to become available, and utilization of mobile communication terminals may enable more rapid transmission of such large-capacity data to a base where the data is edited.

In addition, there is a technique by which, when a still image or a moving image is captured by a digital camera, a user records sound data as a sound memo in association with image data, thereby organizing and assembling information captured. Japanese Patent Laid-Open No. 2018-186467 discloses a technique by which a user records a sound memo with a captured image by using a sound memo input function of a digital camera.

In the technique disclosed in Japanese Patent Laid-Open No. 2018-186467, however, the sound memo is able to be recorded only by an image capturing apparatus having a sound memo input function, and other image capturing apparatuses that do not have the sound memo input function are not able to record the sound memo.

SUMMARY

According to various embodiments of the present disclosure, even in an image capturing apparatus that does not have a sound memo input function, a sound memo is able to be recorded by a communication terminal connected to the image capturing apparatus, and when an image in the image capturing apparatus is transmitted to a server via the communication terminal, the associated sound memo recorded in the communication terminal is also able to be transmitted.

According to one embodiment of the present disclosure, a communication terminal is provided that acquires a captured image from an image capturing apparatus and transfers the captured image to a server. The communication terminal includes: a first communication unit configured to communicate with the image capturing apparatus; a second communication unit configured to communicate with the server; a display unit configured to communicate with the image capturing apparatus by using the first communication unit, acquire, from the image capturing apparatus, a captured image managed by the image capturing apparatus, and display the captured image; a sound input unit configured to accept sound input for generating a terminal sound memo related to the captured image displayed by the display unit; a storage unit configured to store the generated terminal sound memo in association with the captured image; and a control unit configured to perform control so that the second communication unit transfers, to the server, the captured image acquired from the image capturing apparatus by using the first communication unit and the generated terminal sound memo associated with the captured image.

Further features will become apparent from the following description of exemplary embodiments with reference to the attached drawings.

DESCRIPTION OF THE EMBODIMENTS

Various embodiments of the present disclosure will be described in detail below with reference to the accompanying drawings. However, components described in the described embodiments are merely examples, and the scope of the invention is not intended to be limited only to the embodiments.

First Embodiment (System Configuration)

Figure 1:
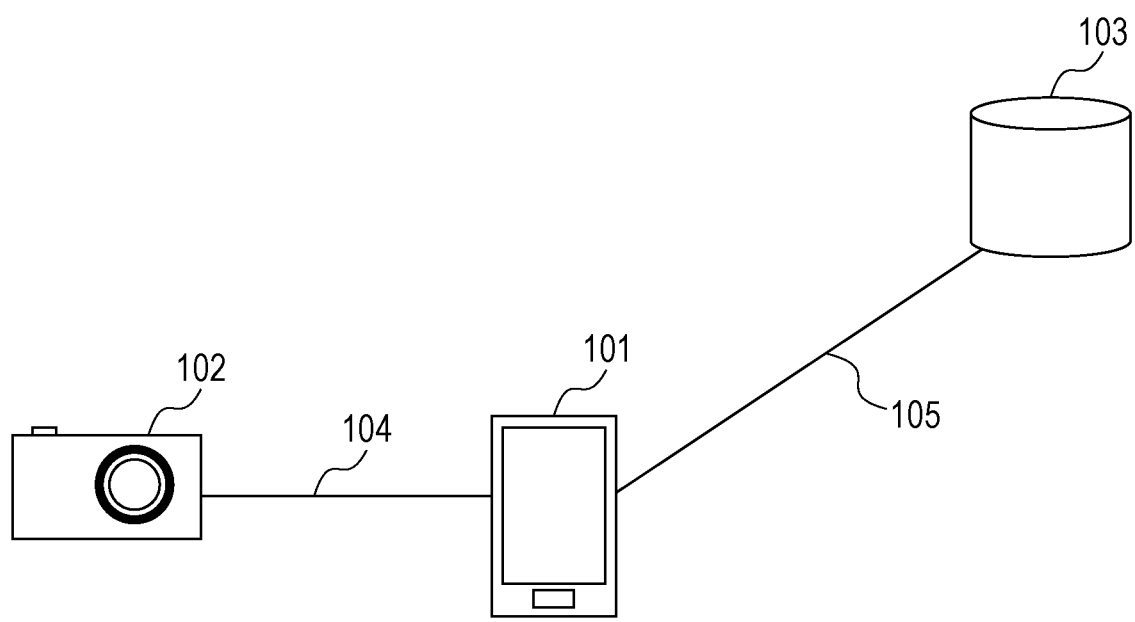
FIG. 1 is a view for explaining an example of a configuration of a system that includes communication equipment and an image capturing apparatus according to one embodiment of the present disclosure.

FIG. 1 is a schematic view of a system configuration of a system that includes communication equipment and an image capturing apparatus according to one embodiment of the present disclosure.

In FIG. 1, communication equipment 101 operating as a mobile terminal is an information processing apparatus that is represented by a smartphone or a computer and that has a communication function. An image capturing apparatus 102 is a digital camera or the like. A server 103 is an image storage apparatus installed at a destination of a connection achieved with the communication equipment 101 via a communication network such as the Internet. In FIG. 1, the communication equipment 101 and the image capturing apparatus 102 are connected by a wired or wireless communication system via a connection unit 104 such as a cable or Wi-Fi, and a still image generated by the image capturing apparatus 102 or a sound file recorded to accompany the still image is able to be transferred to the communication equipment 101. That is, when the communication equipment 101 and the image capturing apparatus 102 communicate via the connection unit 104, they function as a communication system. Further, the communication equipment 101 and the server 103 are connected through a communication unit 105 such as a mobile network, and information temporarily saved in the communication equipment 101 is able to be transferred to the server 103 via the communication unit 105.

(Communication Equipment Configuration)

Figure 2:
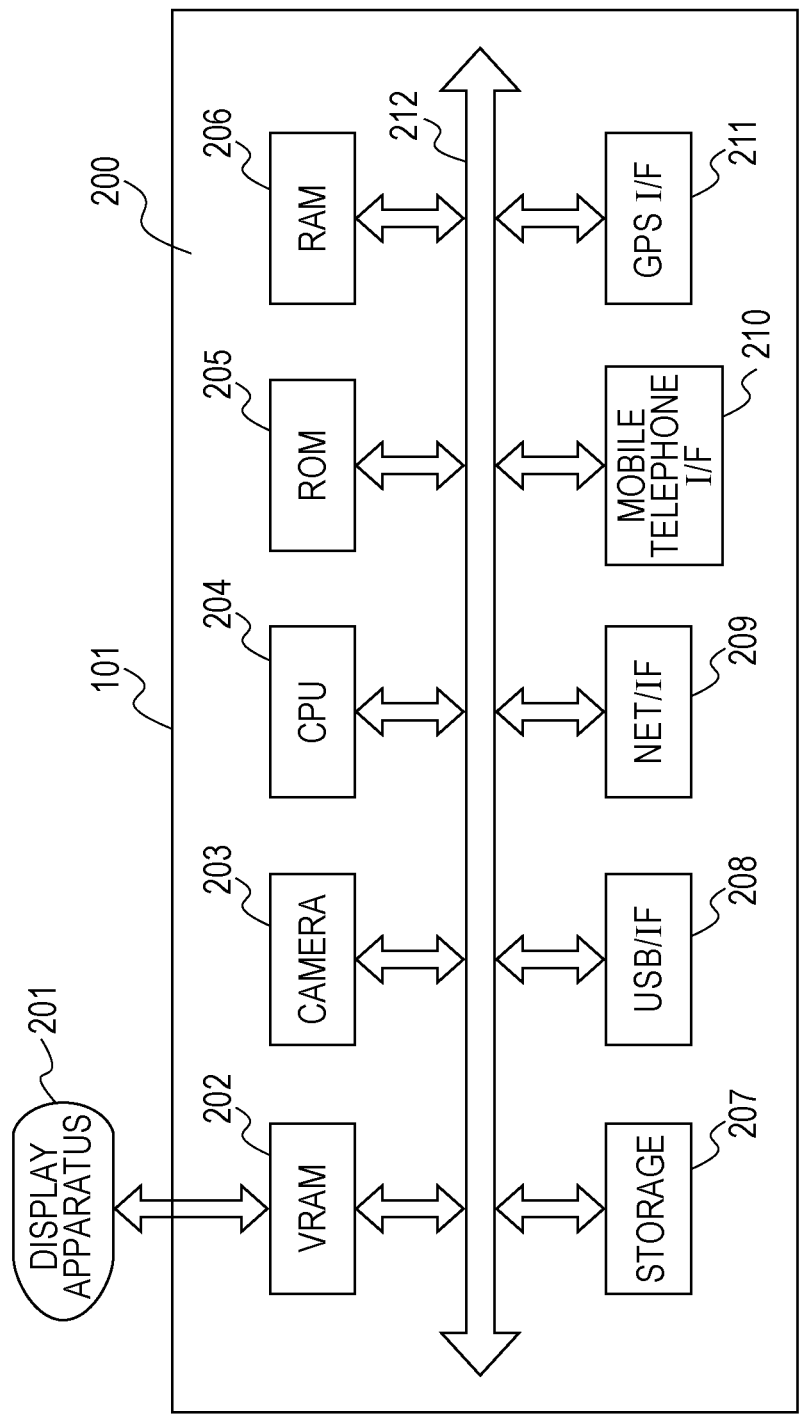
FIG. 2 is a block diagram illustrating an example of a hardware configuration of the communication equipment according to one embodiment of the present disclosure.

FIG. 2 is a block diagram illustrating an example of a hardware configuration of the communication equipment 101 according to the present embodiment.

In FIG. 2, a housing 200 is a housing of the communication equipment 101. A display apparatus 201 such as an LCD (liquid crystal display) or an EL (electroluminescent) display that displays an operation screen or a state screen of the communication equipment 101 is constituted by a touch panel and is used additionally as a pointing device by detecting a user input position, for example, in accordance with contact with a finger, a stylus pen, or the like. It is also possible to provide a software keyboard by sensing a position of a character key by using image formation in a keyboard form displayed on the display apparatus 201.

In a VRAM (video RAM) 202, an image to be displayed on a display screen of the display apparatus 201 is drawn. The image generated in the VRAM 202 is transferred to the display apparatus 201 in accordance with a predetermined rule so that the image is displayed on the display apparatus 201.

A built-in camera 203 as an optical image information input apparatus attached to the communication equipment 101 receives input of, for example, image information of a still image, a moving image, or the like or fingerprint authentication information via a touch sensor or the like.

A central processing unit (CPU) 204 controls respective devices, which are connected via a bus 212, on the basis of control programs stored in a read-only memory (ROM) 205 and storage 207.

A ROM 205 holds various control programs and data.

A RAM (random access memory) 206 provides a work area for the CPU 204, a data saving area used during error processing, an area for loading a control program, and the like. In the system of the present embodiment, various programs for controlling the system are loaded.

The storage 207 is data storage in the information processing apparatus 101 of the present disclosure in which electronic information is recorded and saved and corresponds to a hard disk drive (HDD), a solid state drive (SSD) constituted by flash memory, a hybrid drive using both a hard disk and flash memory, a memory card, a memory card reading device, or the like and also includes a large-capacity external hard disk drive HDD connected through a USB interface 208 described later.

A USB (Universal Serial Bus) interface 208 is connected to an external device such as a USB memory, a CD (Compact Disc) drive, or a DVD (Digital Versatile Disc) drive so that it is possible to expand functions of the information processing apparatus.

A communication interface 209 is an interface for communication with other information processing apparatuses, a printer, a server system apparatus on the Internet, or the like by wired communication, wireless communication, or the like. A wireless communication unit using the communication interface 209 also includes a simple communication function with low power consumption, and examples thereof include BLE (Bluetooth® Low Energy) and NFC (Near Field Communication). Communication with the image capturing apparatus 102 having the wireless communication function is also performed by the communication interface 209.

A mobile telephone interface 210 is an interface module for mobile telephone communication and enables communication processing to be performed according to a mobile telecommunication standard, such as 3G or LTE. The mobile telephone interface 210 also includes an antenna device that is needed for input and output of radio waves for the communication processing.

A GPS (global positioning system) interface 211 that is a module for GPS captures radio waves from a plurality of GPS satellites by using an antenna function provided in the module and causes the CPU 204 to perform default calculation processing, thus making it possible to specify location information of the communication equipment 101.

Moreover, though not illustrated, the communication equipment 101 has a microphone as a sound input unit configured to receive input sound and enables sound data input through the microphone to be stored.

In the present embodiment, a control program processed by the CPU 204 may be provided from the ROM 205, the RAM 206, or the data storage 207 or from another information processing apparatus or the like by using the USB interface 208, the network interface 209, or the mobile telephone interface 210.

(Image Capturing Apparatus Configuration)

Figure 3A:
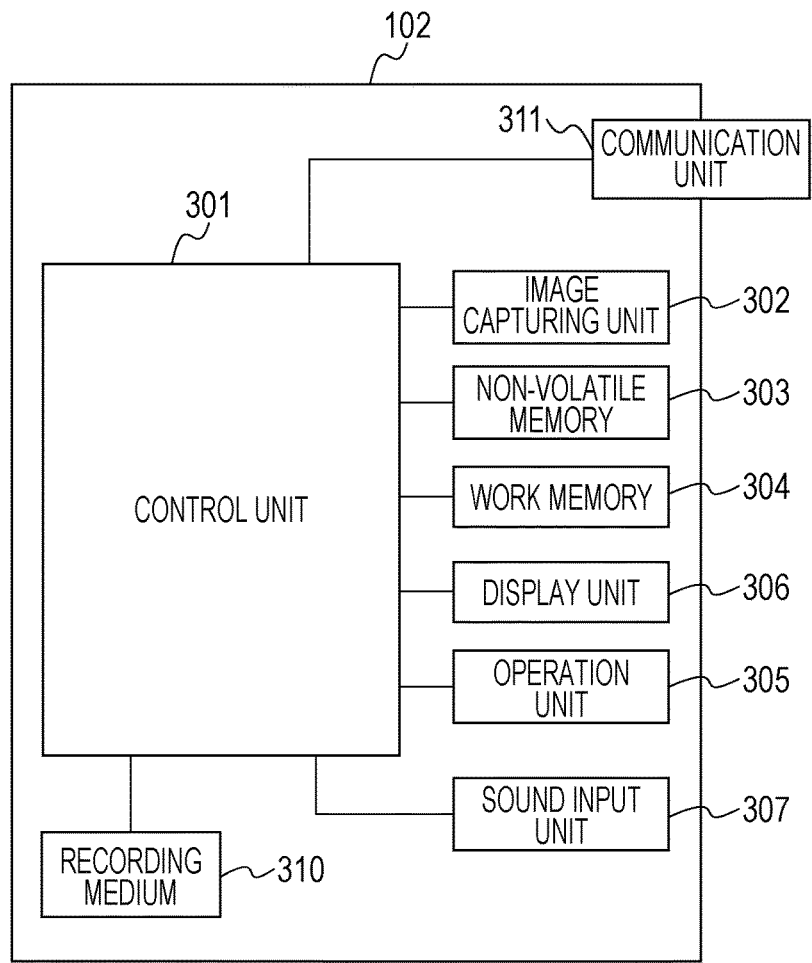
FIG. 3A is a block diagram illustrating an example of a configuration of the image capturing apparatus according to the embodiment of present disclosure.

FIG. 3A is a block diagram illustrating an example of a configuration of the image capturing apparatus 102 of the present embodiment.

A control unit 301 controls respective constituent units of the image capturing apparatus 102 in accordance with an input signal or a running application. Note that, instead of the control unit 301 controlling the entire apparatus, a plurality of pieces of hardware may control the entire apparatus by sharing processing.

An image capturing unit 302 includes, for example, an optical lens unit, an optical system that controls a diaphragm, zooming, focusing, and the like, and an image capturing element for converting light (video), which is introduced via the optical lens unit, into an electrical video signal. A CMOS (complementary metal-oxide semiconductor) or a CCD (charge coupled device) is generally used as the image capturing element. Under control of the control unit 301, the image capturing unit 302 converts subject light focused by a lens included in the image capturing unit 302 into an electrical signal by using the image capturing element, performs noise reduction processing or the like, and outputs image data as digital data. In the image capturing apparatus 102 of the present embodiment, the image data is recorded on a recording medium 310 in accordance with a DCF (Design rule for Camera File system) standard.

A non-volatile memory 303 is an electrically erasable/recordable non-volatile memory and stores an application program executed by the control unit 301 or the like.

A work memory 304 is used as a buffer memory that temporarily holds data of an image captured by the image capturing unit 302, as an image display memory for a display unit 306, a work area for the control unit 301, or the like.

An operation unit 305 is used to accept an instruction for the image capturing apparatus 102 from the user. The operation unit 305 includes, for example, a power button for giving an instruction from the user to switch ON/OFF power of the image capturing apparatus 102, a release switch 305a for giving an image capturing instruction, a reproduce button 305b for giving an instruction to reproduce image data, and the like. The operation unit 305 further includes an operation member such as a connection button dedicated to starting communication with external equipment via a communication unit 311 described later. The operation unit 305 also includes a touch panel 305d forming the display unit 306 described later.

Note that, the release switch 305a includes an SW1 and an SW2. The SW1 is switched ON when the release switch 305a is in a so-called half-pressed state. Thereby, an instruction for preparing for image capturing, such as AF (autofocus) processing, AE (automatic exposure) processing, AWB (automatic white balance) processing, and EF (flash preliminary emission) processing, is accepted. The SW2 is switched ON when the release switch 305a is in a so-called full-pressed state. Thereby, an instruction for capturing an image is accepted.

The display unit 306 displays a viewfinder image during image capture, captured image data, text for user interaction, or the like. Note that, the image capturing apparatus 102 does not necessarily include the display unit 306. It is only necessary that the image capturing apparatus 102 be connectable to an internal or external display unit 306 and have at least a display control function for controlling display of the display unit 306.

The recording medium 310 is able to record image data output from the image capturing unit 302. The recording medium 310 may be configured to be detachable from the image capturing apparatus 102 or may be included in the image capturing apparatus 102. That is, it is only necessary that the image capturing apparatus 102 have at least a way of accessing the recording medium 310.

The communication unit 311 is an interface that enables an external apparatus to be connected. The image capturing apparatus 102 of the present embodiment is able to exchange data with an external apparatus via the communication unit 311. For example, image data generated by the image capturing unit 302 is able to be transmitted to an external apparatus via the communication unit 311. In addition, it is possible to remotely control image capturing by the image capturing unit 302 from an external apparatus via the communication unit 311. Note that, in the present embodiment, the communication unit 311 includes an interface for communicating with an external apparatus by using a so-called wireless LAN that conforms to the IEEE 802.11 standard. For using an external apparatus, the communication unit 311 also includes a USB (Universal Serial Bus) interface and a USB cable. The control unit 301 implements wireless communication with an external apparatus by controlling the communication unit 311.

A sound input unit 307 is a device by which sound information to be added to image data recorded on the recording medium 310 is input, and sound data information converted from the sound information by the sound input unit 307 is recoded on the recording medium 310 in a sound file format as a sound memo (camera sound memo) associated with the image data.

Note that the communication unit 311 of the image capturing apparatus 102 in the present embodiment has an AP (access point) mode in which the communication unit 311 operates as an access point in an infrastructure mode, and a CL (client) mode in which the communication unit 311 operates as a client in the infrastructure mode. In addition, by causing the communication unit 311 to operate in the CL mode, the image capturing apparatus 102 in the present embodiment is able to operate as CL (client) equipment in the infrastructure mode. When the image capturing apparatus 102 operates as the CL equipment, establishing a connection with peripheral AP (access point) equipment enables participation on a network formed by the AP equipment. Furthermore, by causing the communication unit 311 to operate in the AP mode, the image capturing apparatus 102 in the present embodiment is also able to operate as a simplified AP (hereinafter, referred to as a simple AP), which is one type of AP, but with more limited functionality. When the image capturing apparatus 102 operates as the simple AP, the image capturing apparatus 102 forms a network by itself. A peripheral apparatus of the image capturing apparatus 102 recognizes the image capturing apparatus 102 as AP equipment and is able to participate on the network formed by the image capturing apparatus 102. It is assumed that a program for causing the image capturing apparatus 102 to operate as described above is held in the non-volatile memory 303.

Note that, although the image capturing apparatus 102 in the present embodiment is one type of AP, the image capturing apparatus 102 is a simple AP that does not have a gateway function for transferring data received from CL equipment via an Internet service provider or the like. Therefore, even when receiving data from another apparatus participating on a network formed by the image capturing apparatus 102, the image capturing apparatus 102 does not transfer data to a network such as the Internet.

Figure 3B:
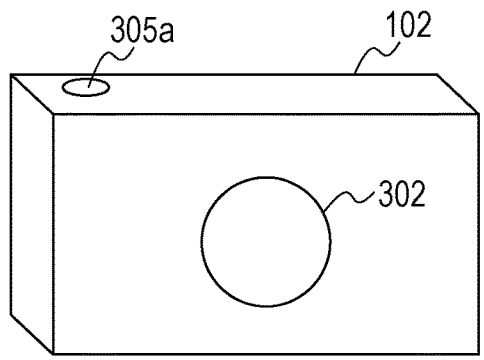
FIGS. 3B and 3C are views each illustrating an example of an external appearance of the image capturing apparatus according to one embodiment of the present disclosure.
Figure 3C:
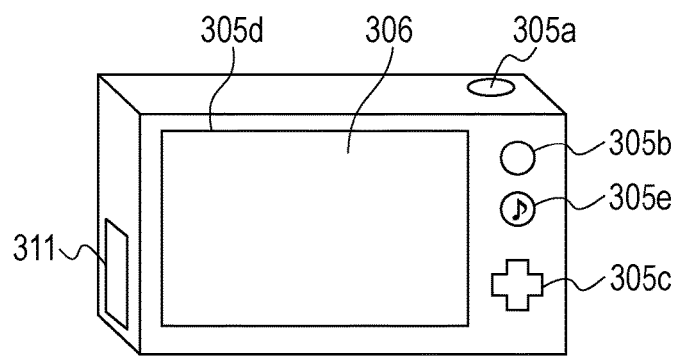

Next, the external appearance of the image capturing apparatus 102 will be described. FIGS. 3B and 3C are views each illustrating an example of the external appearance of the image capturing apparatus 102. The release switch 305a, the reproduce button 305b, a direction key 305c, the touch panel 305d, and a recording button 305e are operation members included in the operation unit 305 described above. In addition, the display unit 306 displays an image obtained as a result of image capturing by the image capturing unit 302. The image capturing apparatus 102 of the present embodiment also has a USB cable connection terminal 311 in a side surface of a camera housing. When the USB cable is connected to the USB/IF 208 of the communication equipment 101, the communication equipment 101 and the image capturing apparatus 102 are able to use high-speed data communication according to a USB standard.

(Image Transfer Application Display Screen)

Next, an aspect of an image transfer application which is executed by the communication equipment 101 in the present embodiment and by which image data stored in the image capturing apparatus 102 is transferred to the server 103 will be described with reference to FIG. 4.

Figure 4:
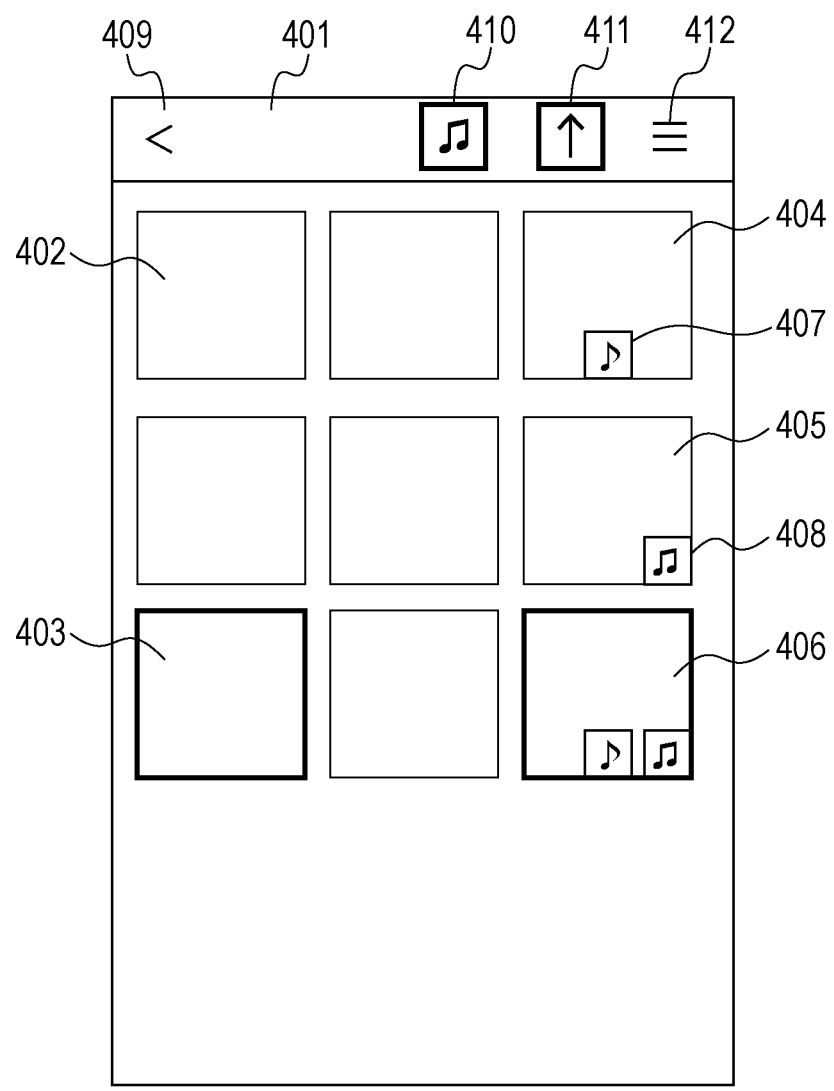
FIG. 4 is a schematic view illustrating an example of an operation screen of an image transfer application according to a first embodiment of the present disclosure.

FIG. 4 is a schematic view illustrating a display state of an operation screen of the image transfer application and a function thereof. In FIG. 4, a screen 401 is an image selection screen on which a list of thumbnails 402 to 406 acquired from an image file saved to the recording medium 310 of the image capturing apparatus 102 is displayed. When a portion in which each of the thumbnails 402 to 406 is displayed on the screen 401 is tapped, the thumbnail is able to be switched between a selected state and a deselected state. The selected state and the deselected state of the thumbnail are distinguishable from each other due to having different graphical presentations, and a thumbnail in the selected state is a target of recording or transfer described later. In FIG. 4, the thumbnails 403 and 406 are in the selected state and the thumbnails 402, 404, and 405 are in the deselected state. For example, when colors, thicknesses, or the like of frames of thumbnail images are differentiated, the user is able to distinguish between the selected state and the deselected state.

An image 404 is an example of thumbnail display of an image file accompanied by a camera sound memo and indicates by icon display (camera sound memo icon 407) that the sound memo associated with the image 404 is saved to the recording medium 310 upon a press of the recording button 305e of the image capturing apparatus 102.

An image 405 is an example of thumbnail display of an image file accompanied by a terminal sound memo and indicates by icon display (terminal sound memo icon 408) that the sound memo (terminal sound memo) recorded in the communication equipment 101 and associated with the image 405 is saved to the recording medium 310.

Note that, in an image 406, both the camera sound memo icon 407 and the terminal sound memo icon 408 are displayed, indicating that sound memos of both accompany an image file. In the present embodiment, by displaying different icons in accordance with a type of sound memo, the user is able to distinguish the type of the sound memo accompanying the image file but may also be able to distinguish the type by another display method.

In FIG. 4, when a return button 409 on the screen 401 is tapped, selection states of all images displayed on the screen 401 are discarded and the image transfer application ends. When a recording button 410 is tapped in a state where an image is selected on the screen 401, recording for a fixed time starts and a sound memo is generated and saved to the storage 207. The generated sound memo is recorded in association with an image that is in the selected state on the screen 401, and the terminal sound memo icon 408 is displayed on a thumbnail. Note that, display of an image on which the terminal sound memo icon 408 has already been displayed does not change.

Next, when a transfer button 411 is tapped in a state where an image is selected on the screen 401, the communication equipment 101 obtains, from the image capturing apparatus 102, an image file of an original image of each image in the selected state on the screen 401 and transfers the image file to the server 103 that is set as a transfer destination. When a camera sound memo has been associated with an image to be transferred, the communication equipment 101 also obtains the camera sound memo from the image capturing apparatus 102 and transfers the camera sound memo to the server 103. Further, when a terminal sound memo is associated with an image to be transferred, the communication equipment 101 also transfers the terminal sound memo saved to the storage 207 to the server 103. Note that, the original image obtained from the image capturing apparatus 102 here is an image having higher quality than that of an image displayed as a thumbnail.

Note that, when a setting button 412 on the screen 401 is tapped, a setting panel for setting instructions for operation of the image transfer application is opened.

Figure 5:
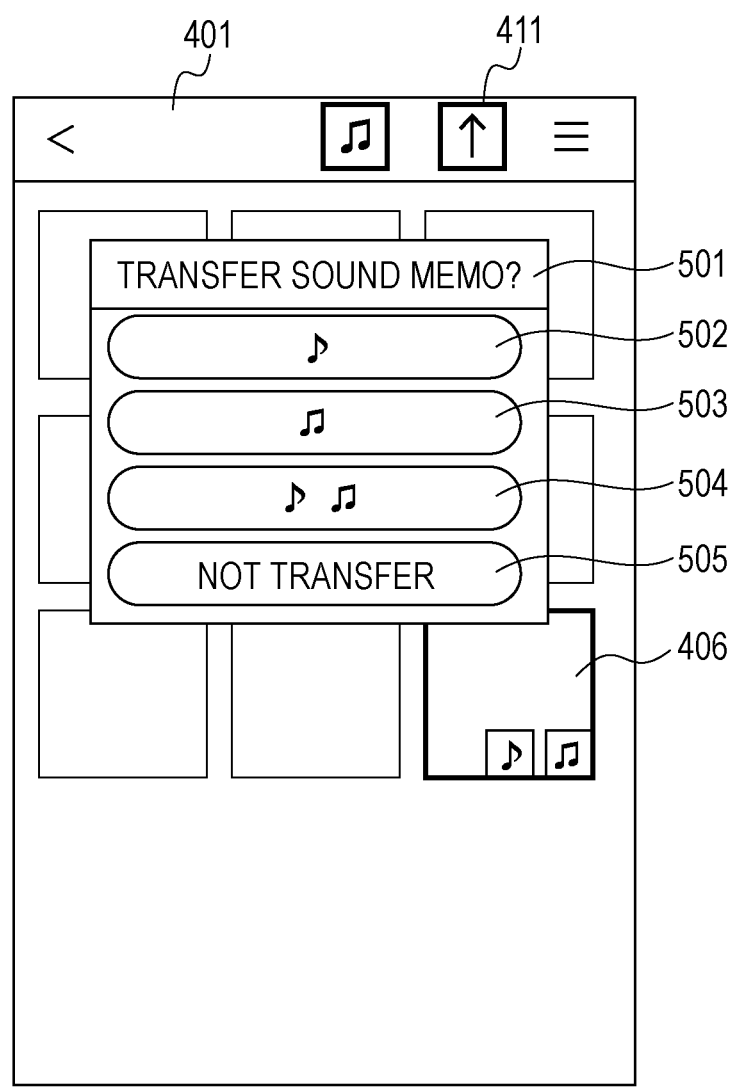
FIG. 5 is a schematic view illustrating an example of a confirmation screen of the operation screen of the image transfer application according to the first embodiment of present disclosure.

FIG. 5 illustrates an example of a confirmation screen displayed when the image 406 associated with both a camera sound memo and a terminal sound memo is transferred to the server 103. When the transfer button 411 is tapped in a state where the image 406 is selected, a confirmation panel 501 is displayed in an overlaid manner. Selection buttons 502 to 505 are arranged on the confirmation panel 501 and the respective selection buttons correspond to sound memos to be transferred. That is, when the selection button 502 is tapped, only the camera sound memo is to be transferred. When the selection button 503 is tapped, only the terminal sound memo is to be transferred. When the selection button 504 is tapped, both the camera sound memo and the terminal sound memo are to be transferred. When the selection button 505 is tapped, no sound memo is to be transferred. The confirmation panel 501 enables the user to select a sound memo, which is to be transferred, in accordance with intended use.

An operation screen of the image transfer application illustrated in each of FIGS. 4 and 5 is an example and another display method may be used. Note that, although an image transfer function and a sound memo recording function of the image transfer application have been described, the present application may have another function. The image transfer application may enable IPTC (International Press Telecommunications Council) information registered in an image in the image capturing apparatus 102 to be displayed by the communication equipment 101 or may enable the IPTC (International Press Telecommunications Council) information to be edited in the communication equipment 101 and registered in an image in the image capturing apparatus 102.

(Setting Panel)

In a case where both a terminal sound memo and a camera sound memo exist for an image to be transferred and the sound memos are overlapped, the user may be able to perform selection with use of the confirmation panel 501 as described above or setting may be performed in advance.

Figure 6:
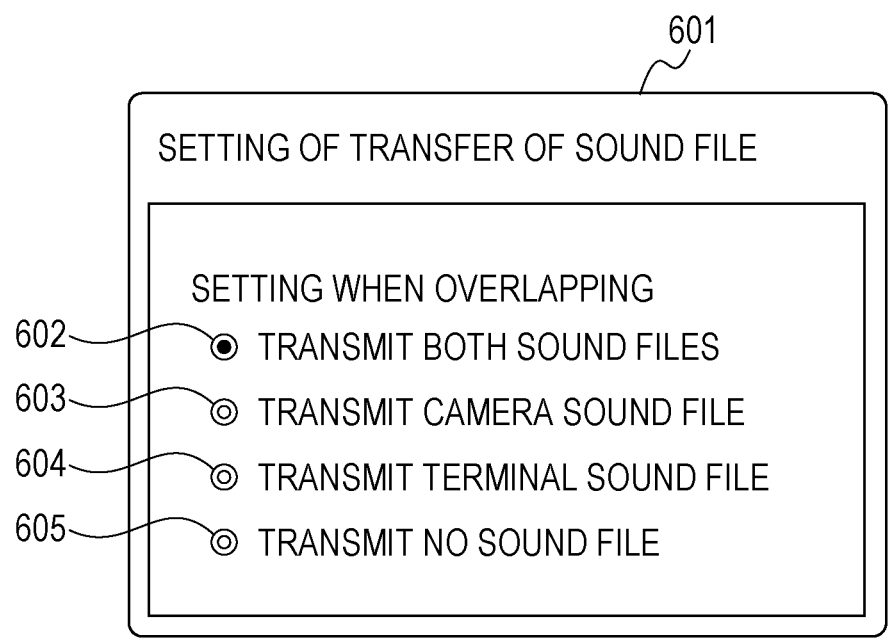
FIG. 6 is a schematic view illustrating an example of a setting screen of the image transfer application according to the first embodiment of the present disclosure.

FIG. 6 is a schematic view illustrating an example of a sound memo setting portion in a setting screen of the image transfer application in the present embodiment. For example, in FIG. 4, when the setting button 412 in the screen 401 is tapped, a setting panel 601 is displayed. Although various items are considered as setting items in addition to a sound memo, the sound memo will be described here and description for other setting items will be omitted.

Items (check boxes) 602 to 605 with radio buttons are displayed on the setting panel 601. The items 602 to 605 are contradictory, and when any one of them is selected, the other items are cancelled. That is, control is performed so that a plurality of items are not valid at the same time.

When the item 602 is selected, both the sound memos are to be transferred at a time of image transfer. When the item 603 is selected, only the camera sound memo is to be transferred, and when the item 604 is selected, only the terminal sound memo is to be transferred. Further, when the item 605 is selected, no sound memo is transferred.

Note that, by adjusting an item content, similar control is able to be applied even in a case where there is only any one of sound memos for the image. In addition, the setting panel 601 is an example and a screen display method of the image transfer application and a content of an option are not limited thereto.

(Transfer Processing Flow)

Next, a flow of processing of transferring an image and a sound memo of the image transfer application in the present embodiment will be described with reference to a flowchart of FIG. 7.

Figure 7:
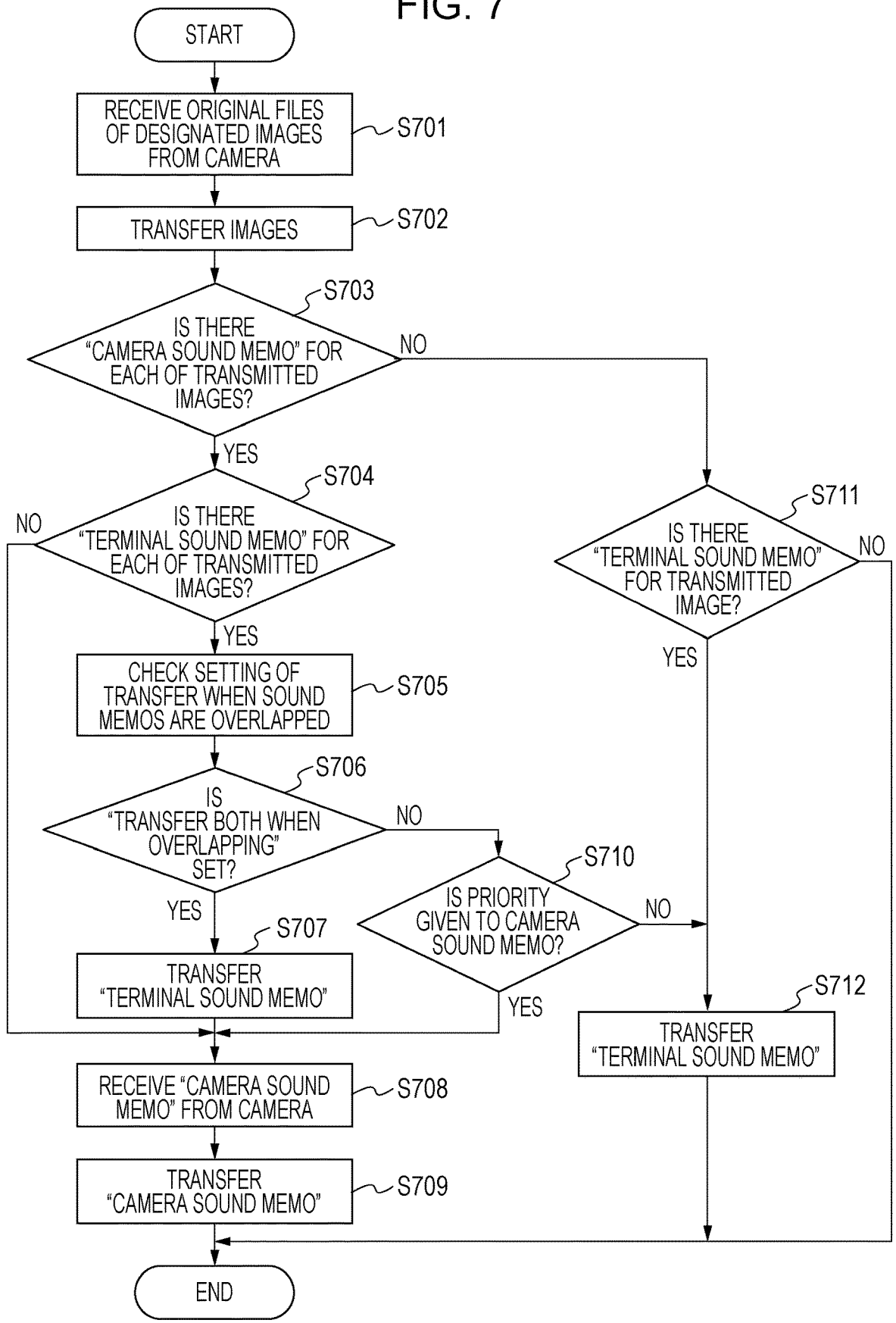
FIG. 7 is a flowchart illustrating an example of a flow of processing of the image transfer application according to the first embodiment of the present disclosure.

In FIG. 7, when an instruction to transfer an image is accepted at step S701 upon a press of the transfer button 411, original images of the images 403 and 406 that are in the selected state on the operation screen are received from the image capturing apparatus 102, and the received images are transferred to the server 103 at step S702.

Whether or not a camera sound memo accompanies each of the transmitted images is checked at step S703, and whether or not a terminal sound memo accompanies each of the images is checked at step S704 or step S711.

In a case where both the camera sound memo and the terminal sound memo accompanies the same image to be transmitted at step S704, setting of transfer when the sound memos are overlapped is checked at step S705. For example, the setting of transfer is checked in a state where setting is performed in the transfer setting panel 601 in FIG. 6. Then, in a case where a result of checking the setting panel 601 indicates that the check box 602 is checked and an instruction to set both the sound memos is given at step S706, the terminal sound memo is transferred to the server 103 at step S707, and then, the camera sound memo is received from the image capturing apparatus 102 at step S708, and the camera sound memo is transferred to the server 103 at step S709.

In a case where transfer of both the sound memos is not designated in the transfer setting panel 601 at step S706, when transmission of the camera sound memo in the check box 603 is instructed at step S710, it is determined that priority is given to the camera sound memo, and the camera sound memo is received from the image capturing apparatus 102 at step S708 and the camera sound memo is transferred to the server 103 at step S709. When transmission of the terminal sound memo in the check box 604 is instructed at step S710, it is determined that priority is given to the terminal sound memo, and the terminal sound memo is transferred to the server 103 at step S712.

In a case where it is determined that the camera sound memo exists and that no terminal sound memo exists at step S704, the camera sound memo is received from the image capturing apparatus 102 at step S708 and the camera sound memo is transferred to the server 103 at step S709. In a case where it is determined that no camera sound memo exists and that the terminal sound memo exists at step S711, the terminal sound memo is transferred to the server 103 at step S712. Note that, in a case where it is determined that no camera sound memo or terminal sound memo exists at step S711, the procedure ends as it is.

By following the flow illustrated in FIG. 7, in the image transfer application in the present embodiment, in accordance with an adding situation of a sound memo to an image to be transferred and a setting state of the user, transfer of the sound memo is able to be controlled in accordance with a condition. Note that, order of transfer of images and sound memos, a determination timing, and the like are not limited to the example of FIG. 7, and are able to be appropriately changed for a design reason.

Other embodiments of the present disclosure will be described below with reference to drawings. In each of the embodiments, the configuration (FIG. 1) of the system, the configuration (FIG. 2) of the communication equipment 101, and the configuration (FIG. 3A) of the image capturing apparatus 102 are the same as those of the first embodiment, so that description thereof will be omitted.

Second Embodiment

As a second embodiment of the present disclosure, processing in which, when an operation of newly generating a camera sound memo or a terminal sound memo and adding the resultant to an image is performed, transfer of the image starts upon the operation will be described.

Figure 8:
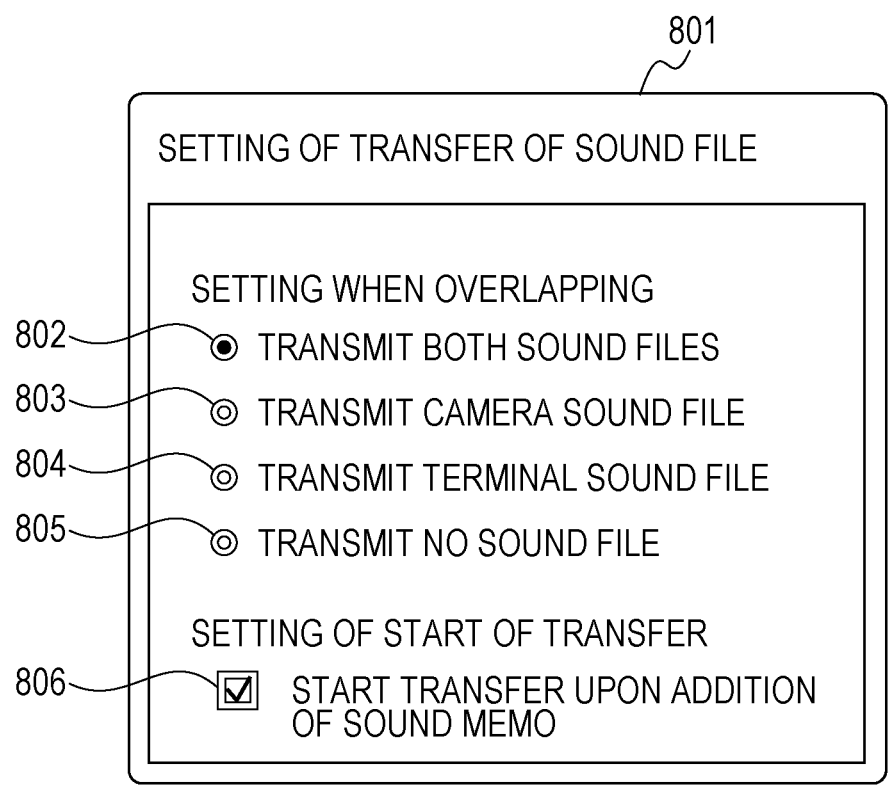
FIG. 8 is a schematic view illustrating an example of a setting screen of an image transfer application according to a second embodiment of the present disclosure.

FIG. 8 is a schematic view illustrating a configuration of a transfer setting panel 801 of a sound memo in an image transfer application that runs in the communication equipment 101 in the present embodiment.

In FIG. 8, items 802 to 805 with radio buttons are displayed on the transfer setting panel 801. Functions of the respective radio buttons are equivalent to those of the items 602 to 605 with the radio buttons in FIG. 6. With a check button 806, switching on and off of check are able to be switched. In a state where the check of the check button 806 is switched on, setting is performed so that transfer of an image starts when a state changes, for example, due to a sound memo generated and added in the image capturing apparatus 102 or the communication equipment 101.

Next, a flow of processing of transferring an image and a sound memo in the present embodiment will be described with reference to a flowchart of FIG. 9.

Figure 9:
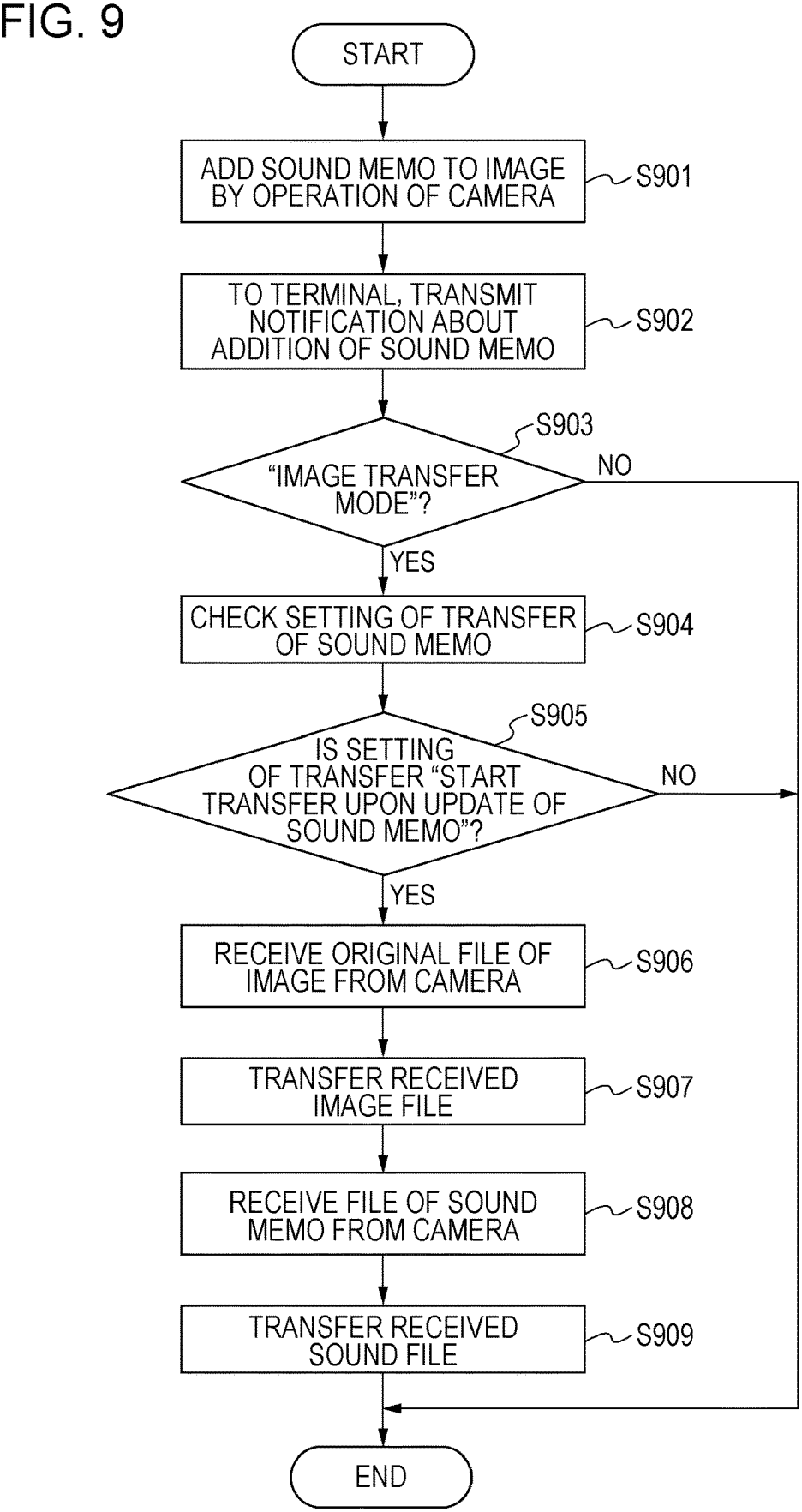
FIG. 9 is a flowchart illustrating an example of a flow of processing of starting transmission when a camera sound memo is updated according to the second embodiment of the present disclosure.

FIG. 9 is the flowchart for explaining transfer processing when a camera sound memo is added in the image capturing apparatus 102.

In FIG. 9, when a sound memo is added in the image capturing apparatus 102 at step S901, notification indicating that the sound memo is added is transmitted from the image capturing apparatus 102 to the communication equipment 101 at step S902. Thereby, the communication equipment 101 is able to detect the addition of the sound memo. At step S903, when the image transfer application does not run on the communication equipment 101, the processing ends as it is, but when the image transfer application runs and a state where an image is able to be transferred is provided, a state of the transfer setting panel 801 is checked at step S904.

In a case where the check box 806 is in an off state at step S905, the processing ends without any change. On the other hand, in a case where the check box 806 is in an on state and setting to start update upon addition of a sound memo is performed at step S905, an original image of an image added with the sound memo is acquired from the image capturing apparatus 102 at step S906. Then, the acquired image is transferred to the server 103 at step S907, and further, the added sound memo is acquired from the image capturing apparatus 102 at step S908, and the sound memo is transferred to the server 103 at step S911.

Figure 10:
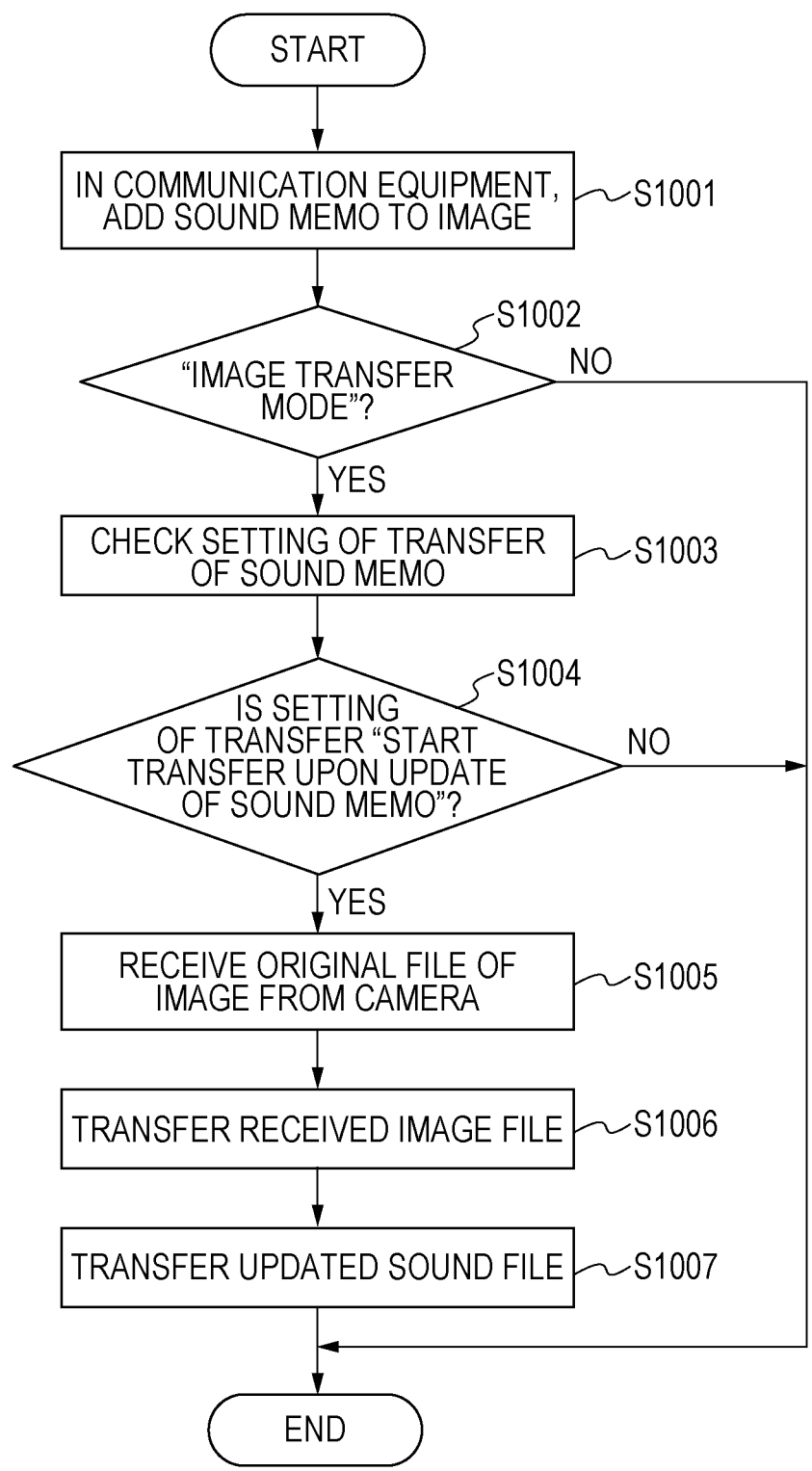
FIG. 10 is a flowchart illustrating an example of a flow of processing of starting transmission when a terminal sound memo is updated according to the second embodiment of the present disclosure.

FIG. 10 is a flowchart for explaining transfer processing when a terminal sound memo is added in the communication equipment 101.

In FIG. 10, in a case where it is detected at step S1001 that a sound memo is added in the communication equipment 101, when the image transfer application does not run on the communication equipment 101 at step S1002, the processing ends as it is, but when the image transfer application runs and a state where an image is able to be transferred is provided, a state of the transfer setting panel 801 is checked at step S1003.

In a case where the check box 806 is in the off state at step S1004, the processing ends without any change. On the other hand, in a case where the check box 806 is in the on state and setting to start update upon addition of a sound memo is performed at step S1004, an original image of a captured image added with the sound memo is acquired from the image capturing apparatus 102 at step S1005. Then, the acquired image is transferred to the server 103 at step S1006, and further, the added sound memo is transferred to the server 103 at step S1007.

In the present embodiment, transfer of an image starts upon a sound memo newly generated and added, but may start upon a change of a content of the sound memo, application or change of a rating value of the image, trimming editing of the image, or the like. Further, when a common operation is performed in the image capturing apparatus 102 and the communication equipment 101, transfer processing of an image may start upon the operation.

Third Embodiment

Next, as a third embodiment of the present disclosure, processing by which, when an instruction to transmit an image and a sound memo is given by the user, transfer processing is performed with a minimum amount of communication and a minimum time of communication by preventing retransfer of data that has been already transmitted will be described.

(Transfer Management Table Configuration)

Figure 11:
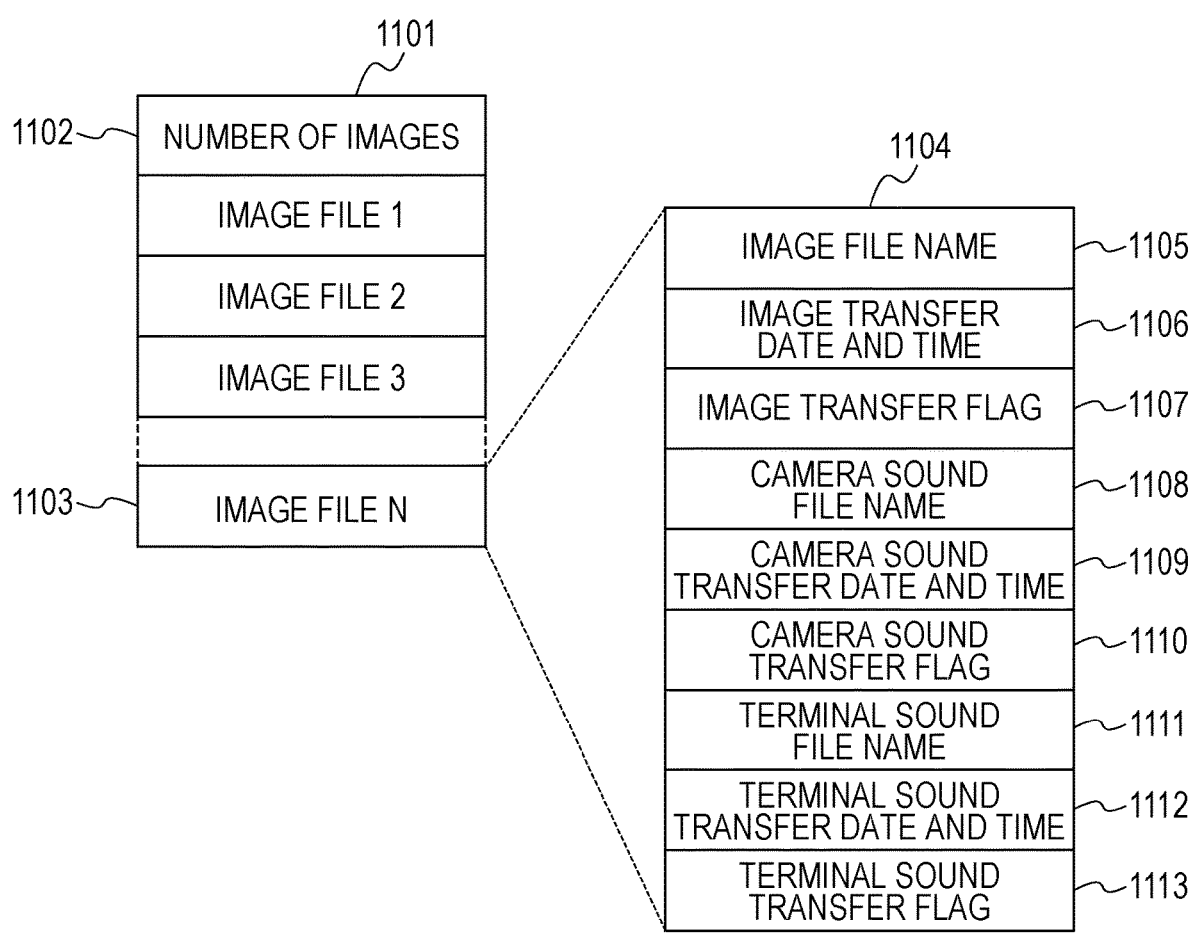
FIG. 11 is a block diagram illustrating a concept of a transfer management table of an image transfer application according to a third embodiment of the present disclosure.

FIG. 11 is a schematic view of a transfer management table for managing a transfer situation of an image in an image transfer application that runs on the communication equipment 101. It is assumed that the transfer management table is generated on the basis of a list of images, which are recorded on the recording medium 310 of the image capturing apparatus 102, when the communication equipment 101 and the image capturing apparatus 102 are connected firstly, is developed onto the RAM 206 when the image transfer application runs, and is updated at any time in accordance with an operation of the image capturing apparatus 102, such as image capturing or deletion of an image.

In FIG. 11, an image management table 1101 is constituted by the number of images 1102 of all images recorded on the recording medium 310 of the image capturing apparatus 102 and an information block 1103 of each of the images.

An image information block 1104 is an internal configuration of the information block 1103 of each of the images and holds, as information about the image, an image file name 1105, an image transfer date and time 1106, and an image transfer flag 1107. The image file name 1105 is a character string of a file name of the image, the image transfer date and time 1106 is information about date and time when the image is transferred last time, and the image transfer flag 1107 is a bit flag indicating whether or not the image is transferred.

The image information block 1104 also holds a camera sound file name 1108, a camera sound file transfer date and time 1109, and a camera sound transfer flag 1110 as information about a camera sound memo associated with the image and recorded on the recording medium 310 of the image capturing apparatus 102. The camera sound file name 1108 is a character string of a file name of the sound memo that accompanies the image, the camera sound transfer date and time 1109 is information about date and time when the camera sound memo is transferred, and the camera sound transfer flag 1110 is a bit flag indicating whether or not the camera sound memo is transferred.

The image information block 1104 also holds a terminal sound file name 1111, a terminal sound file transfer date and time 1112, and a terminal sound transfer flag 1113 as information about a terminal sound memo associated with the image and recorded in the storage 206 of the communication equipment 101. The terminal sound file name 1111 is a character string of a file name of the sound memo that accompanies the image, the terminal sound transfer date and time 1112 is information about date and time when the terminal sound memo is transferred, and the terminal sound transfer flag 1113 is a bit flag indicating whether or not the terminal sound memo is transferred.

Since whether or not an image of the image capturing apparatus 102 is transferred to the server 103 is able to be determined by referring to a record in the transfer management table, a non-transferred image is able to be displayed through filtering on thumbnail display of the image transfer application. The display through filtering makes it easy to collectively select non-transferred images and designate them as transfer targets.

(Processing Flow)

Next, a flow of processing of transferring a needed file to the server 103 with use of the transfer management table by preventing retransfer of an image or sound memo that has been already transferred in the present embodiment will be described with reference to a flowchart of FIG. 12.

Figure 12:
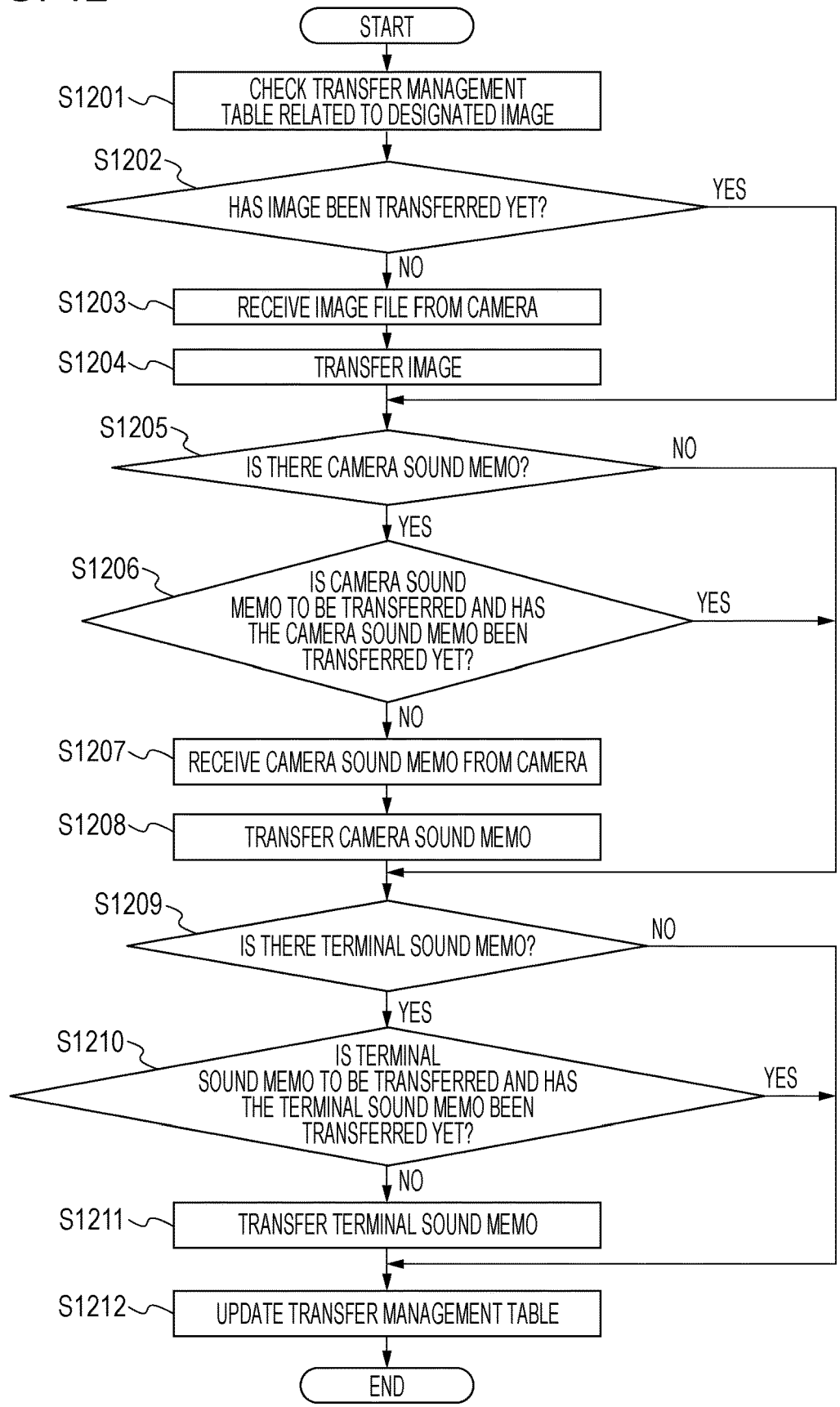
FIG. 12 is a flowchart illustrating an example of a flow of processing of the image transfer application according to the third embodiment of the present disclosure.

In FIG. 12, by referring to the image information block 1104 of the transfer management table 1101 related to an image that is designated to be transferred, a transfer history thereof is checked at step S1201.

At step S1202, whether or not the image has already been transferred is determined by referring to a state of the image transfer flag 1107. However, even in a case where the image transfer flag 1107 indicates an already transferred state, when the image transfer date and time 1106 is earlier as a result of comparison between the transfer date and time 1106 and date and time when the image is updated, the image is regarded as being updated after the transfer and treated as not having been transferred yet.

When the image is regarded as not having been transferred yet, the image is captured from the image capturing apparatus 102 at step S1203 and transferred to the server 103 at step S1204.

When it is determined at step S1202 that the image has been transferred, whether or not there is a camera sound memo is determined at step S1205 in accordance with presence or absence of the camera sound file name 1108 in the image information block 1104.

In a case where there is a camera sound memo at step S1205, whether the camera sound memo is to be transferred and has already been transferred is determined on the basis of a setting state of the transfer setting panel 601, the camera sound transfer flag 1110, and the camera sound transfer date and time 1109 at step S1206. Although whether or not having already been transferred is recorded in a bit state in the camera sound transfer flag 1110, even in a case where the flag indicates the already transferred state, when the camera sound transfer date and time 1109 is earlier as a result of comparison between the transfer date and time 1109 and date and time when a file is updated, the camera sound memo is regarded as being updated after the transfer and is treated as not having been transferred yet. In a case where the camera sound memo is regarded as not having been transferred yet, the camera sound memo is captured from the image capturing apparatus 102 at step S1207 and transferred to the server 103 at step S1208.

In a case where there is no camera sound memo at step S1205 or the camera sound memo is determined as being not to be transferred or as having been already transferred at step S1206, the procedure proceeds to step S1209 without transferring the camera sound memo.

Whether or not there is a terminal sound memo is determined at step S1209 in accordance with presence or absence of the terminal sound file name 1111 in the image information block 1104. In a case where there is a terminal sound memo, whether the terminal sound memo is to be transferred and has already been transferred is determined on the basis of a setting state of the transfer setting panel 601, the terminal sound transfer flag 1113, and the terminal sound transfer date and time 1112 at step S1210. Although whether or not having already been transferred is recorded in a bit state in the terminal sound transfer flag 1113, even in a case where the flag indicates the already transferred state, when the terminal sound transfer date and time 1112 is earlier as a result of comparison between the transfer date and time 1112 and date and time when a file is updated, the terminal sound memo is regarded as being updated after the transfer and treated as not having been transferred yet.

In a case where the terminal sound memo is regarded as not having been transferred yet, a terminal sound file is transferred to the server 103 at step S1211.

When any of the image, the camera sound memo, and the terminal sound memo is transferred, the items of the image transfer date and time 1106, the image transfer flag 1107, the camera sound transfer date and time 1109, the camera sound transfer flag 1110, the terminal sound transfer date and time 1112, and the terminal sound transfer flag 1113 in the transfer management table 1101 are updated in accordance with a content of the transfer at step S1212.

As a result, in the present embodiment, not only by recording a state of a file that has been already transferred but also by comparing chronological order of date and time of transfer and date and time of update, needed file information is able to be appropriately registered in the server 103.

Further, when the transfer flows of a non-transferred image and a non-transferred sound memo described in the present embodiment are used at a time of end of the image transfer application, a non-transferred image or sound is able to be reliably transferred to the server 103 without being discarded.

(Prevention of Overlapping File Names at Time of Retransfer)

Note that, in the present embodiment, even in a case of an image or sound memo that is transferred to the server 103 once, when being updated after previous transfer, it is determined that the image or the sound memo needs to be retransmitted, and the image or the sound memo is retransferred. A previous transfer file may be overwritten depending on setting of the server 103, or the like. In order to cope with such a problem, a method of changing a file name of the image or the sound memo at a time of retransfer and transferring the image or the sound memo to the server 103 is able to be adopted.

In a case where it is determined at step S1202 in FIG. 12 that retransfer is needed even though the image has been transferred, a file name different from the character string of the image file name 1105 is able to be generated and designated as a file name to be saved after transfer to the server 103. When the new file name generated at this time is added and held in a region of the image file name 1105 of the transfer management table 1101, an image file that has been transmitted at the previous transfer or before that is able to be prevented from being overwritten on the server 103. A character string with any length is expected to be input in the region of the image file name 1105, but a data configuration of a list format of a character string is desired so that a plurality of file names are able to be additionally stored.

Though a method of avoiding overwriting of a file name of an image file on the server 103 due to retransfer of an updated image has been described here, a similar method is able to be adopted also for a sound memo. That is, in a case of a camera sound memo, when it is determined at step S1206 that retransfer is needed, a file name different from the character string saved in the camera sound file name 1108 is generated and designated as a file name to be saved after transfer to the server 103, and the new file name to be saved is added to the camera sound file name 1108. In addition, in a case of a terminal sound memo, when it is determined at step S1209 that retransfer is needed, a file name different from the character string saved in the terminal sound file name 1111 is generated and designated as a file name to be saved after transfer to the server 103, and the new file name to be saved is added to the terminal sound file name 1111.

Such avoidance of overlapping of file names on the server 103 after transfer is able to be carried out by similar information management also in an embodiment other than the present embodiment.

Fourth Embodiment

Next, as a fourth embodiment of the present disclosure, a method of, when a camera sound memo and a terminal sound memo are overlapped, combining two sound files at a time of transmission and transferring the resultant will be described.

(Setting Panel)

Figure 13:
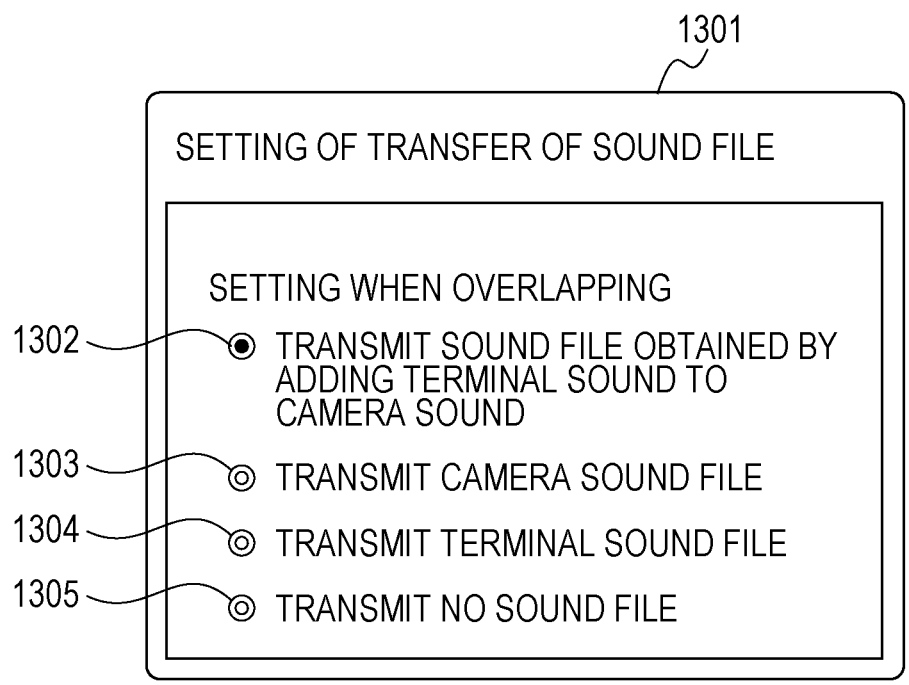
FIG. 13 is a schematic view illustrating an example of a setting screen of an image transfer application according to a fourth embodiment of the present disclosure.

FIG. 13 is a schematic view illustrating an example of a sound memo setting portion in a setting screen of an image transfer application in the present embodiment and the setting portion has a function equivalent to that of the setting panel in FIG. 6 in the embodiment described above.

Selection items (check boxes) 1302 to 1305 with radio buttons are displayed on a setting panel 1301. The respective selection items are contradictory, and control is performed so that, when any one of them is selected, selection of the other items is cancelled and two or more items are not valid at the same time.

In a case where the item 1302 is designated, when there are a terminal sound memo and a camera sound memo and the sound memos are overlapped at a time of transfer of an image, a combined sound memo generated by combining sound files of both of them is to be transferred. In a case where the item 1303 is designated, only the camera sound memo is to be transferred. When the item 1304 is designated, only the terminal sound memo is to be transferred. When the item 1305 is designated, no sound memo is transferred.

Note that, even in a case where a setting panel in a form different from that in FIG. 13 is used, when special processing is able to be designated for overlapped sound memos at a time of transfer of the sound files, an equivalent effect is able to be obtained.

(Transfer Processing Flow)

Next, a flow of processing of transferring an image and a sound memo in the image transfer application in the present embodiment will be described with reference to a flowchart of FIG. 14.

Figure 14:
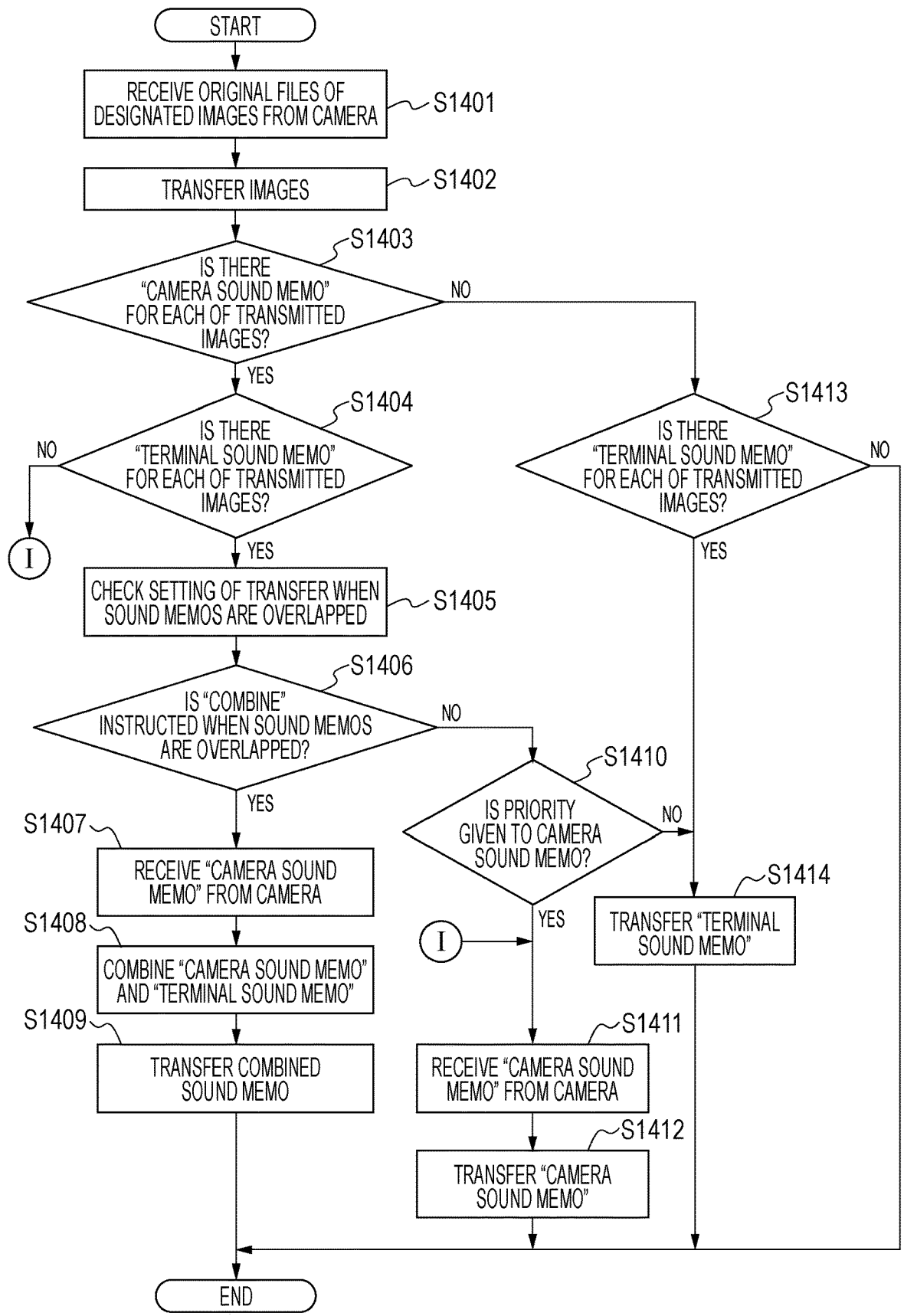
FIG. 14 is a flowchart illustrating an example of a flow of processing of the image transfer application according to the fourth embodiment of the present disclosure.

In FIG. 14, when an instruction to transfer an image is accepted upon a press of the transfer button 411 at step S1401, original image data of images 403 and 406 that are in the selected state on the operation screen is received from the image capturing apparatus 102 and received images are transferred to the server 103 at step S1402.

Whether or not a camera sound memo accompanies each of the transmitted images is checked at step S1403, and whether or not a terminal sound memo accompanies each of the images is checked at step S1404 or step S1413.

When a camera sound memo and a terminal sound memo accompany the transmitted image at step S1404, setting of transfer when the sound memos are overlapped is checked at step S1405 from a state that is set in the transfer setting panel 1301 of FIG. 13. As a result of checking the setting panel 1301, when the check box 1302 is checked and an instruction to combine sound files of both of them is given at step S1406, the camera sound memo is captured from the image capturing apparatus 102 at step S1407 and the captured camera sound memo is combined with a sound file of the terminal sound memo, which is saved in the communication equipment 101, at step S1408. Then, a new sound file generated by the combining is transferred to the server 103 at step S1409 and a series of processing ends.

When combining of sound files is not designated in the transfer setting panel 1301 at step S1406 and an instruction to give priority to the camera sound memo of the check box 1303 is given at step S1410, and when it is determined at step S1404 that a camera sound memo exists but no terminal sound memo exists in the transmitted image, the camera sound memo is received from the image capturing apparatus 102 at step S1411 and the camera sound memo is transferred to the server 103 at step S1412. When an instruction to give priority to the terminal sound memo of the check box 1304 is given at step S1410, and when it is determined at step S1413 that no camera sound memo exists but a terminal sound memo exists in the image, the sound file of the terminal sound memo is transferred to the server 103 at step S1414.

When it is determined at step S1413 that neither a camera sound memo nor a terminal sound memo exists in the transferred image, the processing ends as it is without any change.

According to the example of the flow indicated above, in the image transfer application of the present embodiment, in accordance with an adding situation of a sound memo to an image to be transferred and a setting state of the user, transfer of a sound memo file is able to be controlled, but order of transfer of an image file and a sound file, a determination timing, and the like are not limited to the example of FIG. 14, and are able to be appropriately changed for a design reason.

Note that, although the communication equipment 101 has been described in the embodiments described above by taking a smartphone as an example, the communication equipment 101 is not particularly limited as long as being equipment in which any application is able to be installed. For example, a mobile telephone, a tablet, a personal computer (PC), or the like is similarly applicable as the communication equipment 101. Further, the communication equipment 101 does not necessarily include a communication function and may be implemented by a wide variety of information processing apparatuses.

Various embodiments of the present disclosure are also able to be achieved by processing in which a program that achieves one or more functions of the aforementioned embodiments is supplied to a system or an apparatus via a network or a storage medium, and one or more processors in a computer of the system or the apparatus read out and execute the program. Moreover, various embodiments of the present disclosure are also able to be achieved by a circuit (for example, an Application Specific Integrated Circuit (ASIC) or a Field Programmable Gate Array (FPGA)) that realizes one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the embodiments described above, when a captured image is transmitted to a server via a communication terminal connected to an image capturing apparatus, a sound memo related to the captured image to be transferred is also able to be transmitted to the server regardless of whether or not the image capturing apparatus has a sound input function, and organizing and assembling images after image capturing, or the like is able to be effectively performed.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-130283, filed Jul. 12, 2019, which is hereby incorporated by reference herein in its entirety.

What is claimed is:

1. A communication terminal that acquires a captured image from an image capturing apparatus and transfers the captured image to a server, the communication terminal comprising:
   a first communication unit configured to communicate with the image capturing apparatus;
   a second communication unit configured to communicate with the server;
   a display unit configured to communicate with the image capturing apparatus by using the first communication unit, acquire, from the image capturing apparatus, a captured image managed by the image capturing apparatus, and display the captured image;
   a sound input unit configured to accept sound input for generating a terminal sound memo related to the captured image displayed by the display unit;
   a storage unit configured to store the generated terminal sound memo in association with the captured image; and
   a control unit configured to perform control so that the second communication unit transfers, to the server, the captured image acquired from the image capturing apparatus by using the first communication unit and the generated terminal sound memo associated with the captured image,
   wherein, in a case where both a camera sound memo generated by the image capturing apparatus and the generated terminal sound memo exist for the captured image that is to be transferred, the control unit determines based on a predetermined condition whether to transfer the terminal sound memo together with the captured image to the server or to transfer the camera sound memo together with the captured image to the server, and
   wherein the first communication unit, the second communication unit, the display unit, the sound input unit, the storage unit, and the control unit are implemented by one or more processors.

2. The communication terminal according to claim 1, wherein
   in a case where a captured image to be transferred is associated with both a camera sound memo generated by the image capturing apparatus and the terminal sound memo generated by the communication terminal, the control unit performs control, in accordance with a predetermined condition, so that the second communication unit transfers the terminal sound memo and the camera sound memo to the server.

3. The communication terminal according to claim 2, wherein the control unit performs control so that the second communication unit transfers the terminal sound memo and the camera sound memo to the server in accordance with a date and a time when a sound memo is updated.

4. The communication terminal according to claim 2, wherein the display unit displays a setting screen on which the predetermined condition is set.

5. The communication terminal according to claim 1, wherein in a case where it is detected that a camera sound memo is newly generated by the image capturing apparatus,
   the control unit controls the first communication unit and the second communication unit to start processing of acquiring a captured image and the generated camera sound memo from the image capturing apparatus and transferring the captured image and the camera sound memo to the server.

6. The communication terminal according to claim 1, wherein
   in a case where it is detected that a terminal sound memo is newly generated by the communication terminal,
   the control unit controls the first communication unit and the second communication unit to start processing of acquiring a captured image from the image capturing apparatus and transferring the captured image together with the generated terminal sound memo to the server.

7. The communication terminal according to claim 5 further comprising a management unit implemented by one or more processors and configured to manage a transfer history, wherein
   in a case where management by the management unit indicates that a captured image with which a newly generated terminal sound memo or camera sound memo is associated has been transferred, the control unit transfers only the generated terminal sound memo or camera sound memo to the server.

8. The communication terminal according to claim 5 further comprising a management unit implemented by one or more processors and configured to manage a transfer history, wherein
   in a case where management by the management unit indicates that, with respect to a captured image with which a newly generated terminal sound memo or camera sound memo is associated, a terminal sound memo or camera sound memo previously generated has been transferred, a file name of the newly generated terminal sound memo or camera sound memo is differentiated from a file name of the sound memo that has been transferred.

9. The communication terminal according to claim 2 further comprising a combining unit implemented by one or more processors and configured to, in a case where a captured image with which a newly generated terminal sound memo is associated has a camera sound memo generated by the image capturing apparatus, combine the terminal sound memo and the camera sound memo to generate a combined sound memo.

10. The communication terminal according to claim 2, wherein in a case of terminating an application that performs processing for acquiring a captured image from the image capturing apparatus and transferring the captured image to the server, the control unit controls the first communication unit and the second communication unit to transfer, to the server, a terminal sound memo and a camera sound memo that have not been transferred yet.

11. The communication terminal according to claim 1, wherein the display unit performs thumbnail display of captured images managed by the image capturing apparatus and acquired by using the first communication unit and enables a user to select, from the thumbnail display, a captured image for which a terminal sound memo is to be generated.

12. The communication terminal according to claim 11, wherein the display unit displays, on the thumbnail display, an icon indicating that a sound memo exists.

13. The communication terminal according to claim 12, wherein the display unit displays an icon for distinguishing between the terminal sound memo and a camera sound memo.

14. A method for controlling a communication terminal that acquires a captured image from an image capturing apparatus and transfers the captured image to a server, the method comprising:
    communicating with the image capturing apparatus, acquiring, from the image capturing apparatus, a captured image managed by the image capturing apparatus, and displaying the captured image;
    generating a terminal sound memo related to the captured image displayed upon acceptance of sound input;
    storing the generated terminal sound memo in association with the captured image; and
    transferring, to the server, the captured image acquired from the image capturing apparatus and the generated terminal sound memo associated with the captured image,
    wherein, in a case where both a camera sound memo generated by the image capturing apparatus and the generated terminal sound memo exist for the captured image that is to be transferred, whether to transfer the terminal sound memo together with the captured image to the server or to transfer the camera sound memo together with the captured image to the server is determined based on a predetermined condition.

15. A communication system comprising:
    an image capturing apparatus; and
    a communication terminal that acquires a captured image from the image capturing apparatus and transfers the captured image to a server, wherein
    the image capturing apparatus includes
    an image capturing unit, and
    a management unit configured to manage a captured image obtained by the image capturing unit,
    wherein the image capturing unit, and the management unit are implemented by one or more processors, and
    the communication terminal includes
    a first communication unit configured to communicate with the image capturing apparatus,
    a second communication unit configured to communicate with the server,
    a display unit configured to communicate with the image capturing apparatus by using the first communication unit, acquire, from the image capturing apparatus, the captured image managed by the image capturing apparatus, and display the captured image,
    a sound input unit configured to accept sound input for generating a terminal sound memo related to the captured image displayed by the display unit,
    a storage unit configured to store the generated terminal sound memo in association with the captured image, and
    a control unit configured to perform control so that the second communication unit transfers, to the server, the captured image acquired from the image capturing apparatus by using the first communication unit and the generated terminal sound memo associated with the captured image,
    wherein, in a case where both a camera sound memo generated by the image capturing apparatus and the generated terminal sound memo exist for the captured image that is to be transferred, the control unit determines based on a predetermined condition whether to transfer the terminal sound memo together with the captured image to the server or to transfer the camera sound memo together with the captured image to the server, and
    wherein the first communication unit, the second communication unit, the display unit, the sound input unit, the storage unit, and the control unit are implemented by one or more processors.

16. A non-transitory computer readable medium storing a program causing a computer to function as the communication terminal according to claim 1.

* * * * *